(12) United States Patent
Ngan et al.

(10) Patent No.: US 12,387,750 B1
(45) Date of Patent: Aug. 12, 2025

(54) DFH HEATER DESIGN

(71) Applicants: SAE Magnetics (H.K.) Ltd., Shatin (HK); Headway Technologies, Inc., Milpitas, CA (US)

(72) Inventors: Siu Yin Ngan, San Jose, CA (US); Kowang Liu, Fremont, CA (US); Ellis Cha, San Ramon, CA (US)

(73) Assignees: SAE Magnetics (H.K.) Ltd., Shatin (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/738,431

(22) Filed: Jun. 10, 2024

(51) Int. Cl.
| | |
|---|---|
| G11B 5/40 | (2006.01) |
| G11B 5/02 | (2006.01) |
| G11B 5/48 | (2006.01) |
| G11B 5/60 | (2006.01) |
| G11B 5/00 | (2006.01) |

(52) U.S. Cl.
CPC ............... G11B 5/40 (2013.01); G11B 5/02 (2013.01); G11B 5/4826 (2013.01); G11B 5/607 (2013.01); G11B 2005/0021 (2013.01)

(58) Field of Classification Search
None
See application file for complete search history.

(56) References Cited

U.S. PATENT DOCUMENTS

| | | | | |
|---|---|---|---|---|
| 6,808,783 B1 * | 10/2004 | Lin | ............... | G11B 5/657 428/156 |
| 8,081,542 B1 * | 12/2011 | Grobis | ............... | G11B 5/82 360/59 |
| 8,599,653 B1 | 12/2013 | Mallary et al. | | |
| 8,902,720 B1 * | 12/2014 | Schreck | ............... | G11B 5/3106 369/13.13 |
| 9,202,494 B1 * | 12/2015 | Burgos | ............... | G11B 13/08 |
| 9,601,140 B1 | 3/2017 | Rajauria | | |
| 10,522,176 B1 * | 12/2019 | Yan | ............... | G11B 5/314 |
| 10,629,233 B1 | 4/2020 | Ngan et al. | | |
| 11,217,723 B2 | 1/2022 | Wang et al. | | |
| 11,646,058 B1 | 5/2023 | Blaber et al. | | |
| 11,664,051 B1 | 5/2023 | Zhou et al. | | |

(Continued)

OTHER PUBLICATIONS

Co-pending U.S. Appl. No. 18/738,440, filed Jun. 10, 2024, by Siu Yin Ngan et al., 20 pages.

*Primary Examiner* — Peter Vincent Agustin
(74) *Attorney, Agent, or Firm* — Saile Ackerman LLC; Stephen B. Ackerman

(57) ABSTRACT

A PMR read/write transducer head configured for heat assisted recording (HAMR) includes thermally active nano-bumper pads formed from a thermally active bulge that protrudes proximally to each side of a read element to provide enhanced touchdown (TD) protection to the transducer head element where it emerges adjacent to the HAMR apparatus. The bumper pads, which can be multiple, are disposed about the transducer head and absorb heat energy generated by active heating elements, including the write current. Absorption of this energy causes the bulge to expand and vary its shape and protrude proximally outward from the slider ABS to protect the read/write head from both intentional and unanticipated touchdown events. The PMR read/write head is then mounted on a slider and the assembly is incorporated into a hard disk drive (HDD).

19 Claims, 6 Drawing Sheets

(56) References Cited

U.S. PATENT DOCUMENTS

| | | | |
|---|---|---|---|
| 2008/0180827 A1* | 7/2008 | Zhu | G11B 5/82 360/59 |
| 2009/0052077 A1* | 2/2009 | Tanaka | G11B 5/02 360/59 |
| 2017/0278532 A1* | 9/2017 | Ho | G11B 5/315 |

* cited by examiner

DFH HEATER DESIGN

RELATED PATENT APPLICATION

This application is related to U.S. patent application Ser. No. 18/738,440, filed on, Jun. 10, 2024, which is incorporated by reference in its entirety, and assigned to a common assignee.

1. TECHNICAL FIELD

This disclosure relates to magnetic write heads that write on magnetic recording media, particularly to a design of such write heads that offers thermally activated protection against media damage during dynamic events such as operating shocks, load/unload processes and emergency power-off.

2. BACKGROUND

Hard disk drives (HDD) have been increasing the recording density of the magnetic disks on which data storage occurs. Correspondingly, the thin-film magnetic heads used to write and read that data have been required to improve their performance as well. The thin-film read/write heads most commonly in use are of a composite type, having a structure in which a magnetic-field detecting device, such as a giant-magnetoresistive (GMR) read sensor is used together with a magnetic recording device, such as an electromagnetic coil inductive device. These two types of devices are laminated together and mounted on a rectangular solid prism-shaped device called a slider. The slider literally flies over the rotating surface of the disk being held aloft by aerodynamic forces at a height called the fly height (FH). The read/write head is mounted in the slider where it serves to read and write data signals, respectively, from/onto magnetic disks which are the usual magnetic recording media in a HDD. The magnetic writer portion of the read/write head is a small electrically activated coil that induces a magnetic field in a pole. The field, in turn, emerges at a narrow write gap (WG) and can change the direction of the magnetic moments of small magnetic particles, or groups of particles, embedded in the surface of the disk. If the embedded particles are embedded in such a way that their moments are perpendicular to the disk surface and can be switched up and down relative to the plane of that surface, then you have what is called perpendicular magnetic recording (PMR). The perpendicular arrangement produces a more densely packed region for magnetic recording.

Perpendicular magnetic recording (PMR) heads, which record in a direction perpendicular to the plane of the recording media, have made it possible to extend the ongoing increase in the recording density of hard disk drives (HDD) beyond 100 Gb/in2. However, even using PMR heads, it is difficult to extend the density beyond 1 Tb/in2 due to thermal stability of the media and the media's super-paramagnetic limit. In order to achieve a higher recording density, a new technology has been developed: Heat Assisted Magnetic Recording (HAMR). Briefly, the media that can be effectively used to record at these ultra-high densities must have extremely high coercivities so that data, once it is recorded, can remain stable even when subjected to thermal effects. Unfortunately, the high coercivities required to maintain the data once it is recorded, also makes it difficult for the limited flux densities of the small PMR heads to actually create magnetic transitions and record that data into the media. One way to do this, is to heat the recording media during the actual recording process so that its coercivity is temporarily reduced and then to record the data on the heated surface. When the surface cools, the coercivity is restored to its ambient value and the recorded data becomes stable.

As is well known, a typical HAMR head is a read/write head (a slider-mounted PMR head in the present case) that is furnished with: (1) a Laser diode to provide optical thermal energy via optical radiation, (2) an optical waveguide to transfer that radiation close to the recording surface, and (3) a plasmon generator located near that surface. The plasmon generator is a device that receives the optical radiation, converts it, by electromagnetic coupling, to the excitation of plasmon modes and then transfers energy from the plasmon near-fields to a region of the recording media. The near-fields, not being radiative, are not subject to diffraction effects and can be highly localized. The localized near-field energy appears as a near-field spot at the tip of the plasmon generator's air bearing surface (ABS). This tiny near field spot emerges at the ABS of the PMR read/write head adjacent to the emerging magnetic pole tip of the write portion of the PMR.

During write operations, the emerging near-field spot induces a very localized temperature rise in the recording media to lower its coercivity and assist magnetic writing. At the same time, the near-field energy induces a very sharp or localized thermally-induced protrusion on the recording head that causes many issues that should be dealt with. Note that this disclosure will address the read/write head and not provide any additional description of these HAMR components that produce the near-field spot as they are now well known in the field and features of the HAMR head, where the near-field energy is deposited and the read/write operations occur. As a result, HAMR drives use glass substrate media to remedy this issue.

In Heat-Assisted Magnetic Recording (HAMR), the near-field transducer induces a very localized temperature rise in the recording medium to assist magnetic writing by lowering the coercivity of the magnetic media. So HAMR drives use media with glass substrates instead of aluminum substrates because the elevated temperatures would cause the aluminum to deform. Since the glass used in HAMR has higher hardness and roughness than aluminum media it increases the head wear during TD calibration in drive. In addition, head-disk interference (HDI) keeps increasing as a result of read and write clearances. Thus, the HAMR HDI degrades reader reliability dramatically.

In addition, HAMR passive flying height becomes higher than in PMR due to the additional heat source which produced extra protrusion during writing. The laser-induced writer protrusion (LIWP) depends on the Iop (operational current of the laser diode) and the writer design of the head. This additional protrusion requires additional passive flying height in order to fit the head-media spacing (HMS) budget in HAMR. With the elevated passive flying height (PFH) reader temperature is increased due to the higher read heater actuation. This causes worse reader performance due to high-temperature noise. To remedy this issue, a novel DFH bulge has been designed to protect the read element from HDI and reduce reader temperature during operation.

SUMMARY

The first object of this disclosure is to provide TD protection to various portions of a HAMR write head by the addition of "active" bumper pads whose shapes are thermally modified by the effects of heat already being produced within the write head.

The second object of this disclosure is to provide such bumper pads which are caused to protrude by the effects of heat already being generated by elements within the HAMR head and wherein the protrusion increases TD contact area and can control the minimum point (closest to the disk) location so that it is away from sensor locations to improve reliability.

The third object of this disclosure is to provide such bumper pads whose global and local protrusion effects will cause points of TD contact to be shifted to shields and other regions that are designed to absorb contacts and thereby to avoid contacts with more sensitive areas of the write head.

A fourth object of this disclosure is to provide bumper pads whose shapes can be controlled to create thermal protrusion asymmetries that may be advantageous for the performance of the HAMR write head.

The objects of this disclosure will be met by the design of a HAMR read/write head configured for perpendicular magnetic recording (PMR) that includes a magnetically shielded GMR read head and a separate, magnetically shielded inductive write head that is activated by a write current. These elements emerge at an ABS of the PMR. The PMR also contains independently operating heater elements, Hr and Hw, that are disposed adjacent to said read head and said write head respectively, but are proximally away from said ABS. The PMR also contains at least one HDIs (head-disk interference sensor) that is mounted in the read/write head. In order to make use of the HAMR system, the write head forms a narrow writing region at its ABS where magnetic flux is emitted by an emergent magnetic pole tip and where near-field plasmon energy emerges at a trailing edge of said pole tip to enable writing on a disk medium. Finally, a pair of thermally active bumper pads, whose shapes are modified by local thermally-induced protrusions, are disposed to either side of the narrow writing region of the write element to protect said region in the event of a touchdown (TD) or other forms of head-disk interference (HDI) by shifting points of possible disk contacts away from the write head and towards the magnetic shields.

DETAILED DESCRIPTION

In dual-independent heater (DIH) operation, the read heater is generally placed beneath the S1 reader shield structure. The read element (GMR) is located between S1 and S2A read shields.

Figure 1:
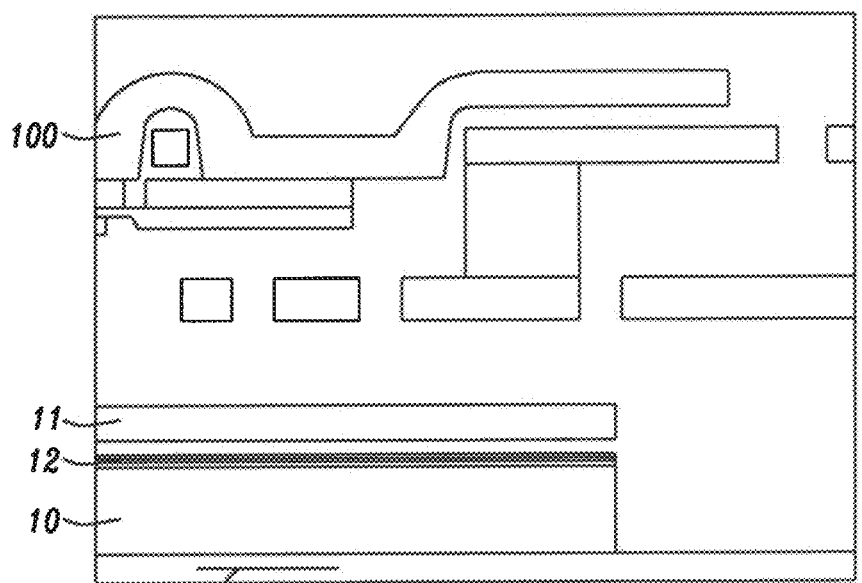
FIG. 1 is a schematic view of a prior art HAMR head. showing a read heater under a read shield.

FIG. 1 shows the read heater (15) and read shield A1 (10) structure. A portion of the magnetic writing apparatus (100) is also indicated but will not be discussed further. Note that the layer (15) is the read heater, which is shown in detail in FIG. 2 as follows.

Figure 2A:
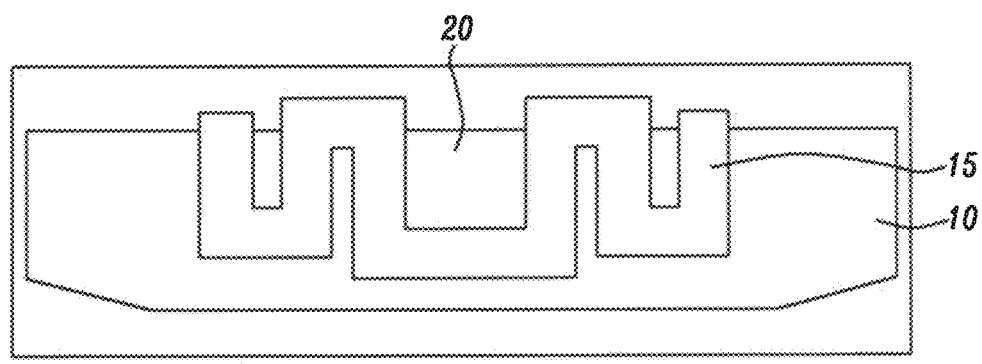
FIG. 2A is a bottom view of the conventional read heater of FIG. 1.

FIG. 2A shows a conventional read heater structure, (15), where a conventional heater element is a conductive serpentine structure formed under a heat shield (10).

Figure 2B:
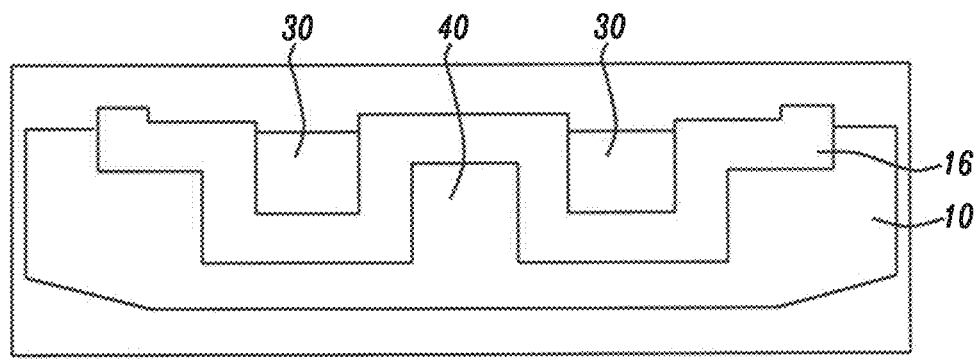
FIG. 2B is a preferred embodiment for the disclosed center-recessed 1 DFH heater design.

In conventional read heater operation, the read heater (15) is energized by a passage of current and transfers heat to S1 read shields (10). A read heater bulge is generated by the thermal expansion of the read shield structure (20). FIG. 2A shows the conventional read heater which is caused to bulge by thermal expansion. FIG. 2B shows the presently disclosed center-recessed read heater 20 and its regions, (30 and 40) which produce an unconventional bulge of the shield because differently shaped regions, (30) and (40), of the read shield (10) are being enlarged by the heat.

Figure 3A:
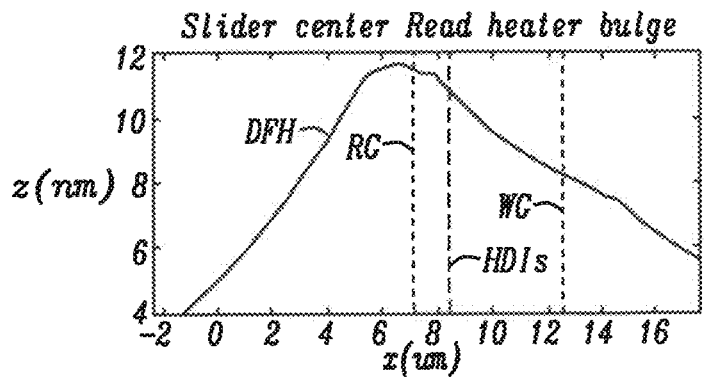
FIG. 3A is a profile for a DFH bulge above the conventional read heater, of FIG. 2A, in a down-track direction.
Figure 3B:
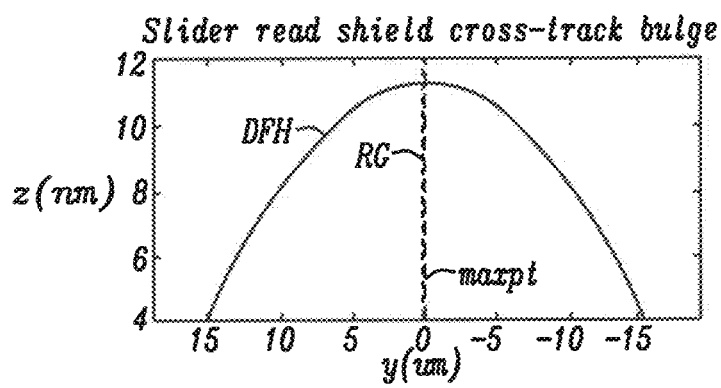
FIG. 3B is a profile for a DFH bulge above a conventional read heater, of FIG. 2A, in a cross-track direction.
Figure 3C:
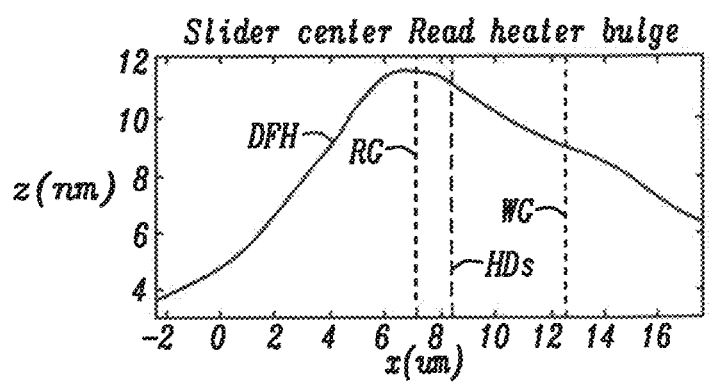
FIG. 3C is a profile for a DFH bulge above the disclosed center-recessed DFH heater of FIG. 2B, in a down-track direction.
Figure 3D:
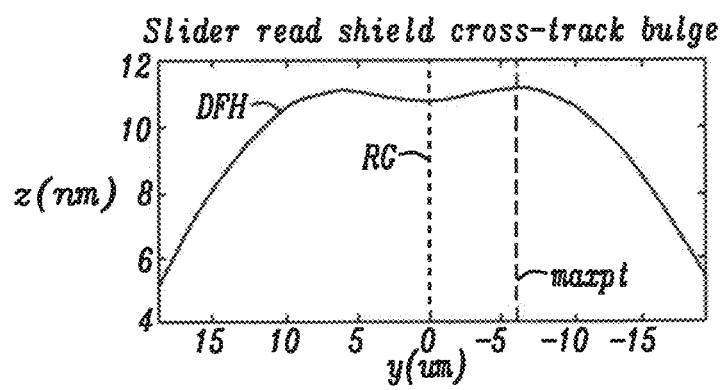
FIG. 3D is a profile for a slider center read heater bulge above the disclosed DFH heater of FIG. 2B, in a cross-track direction.

In a read heater touchdown (TD), the presently created read heater bulge actuates reader spacing and delivers sufficient TD area to trigger TD vibration in the read heater TD. FIG. 3A shows, graphically, the conventional read-heater bulge in a down-track direction, and FIG. 3B shows, graphically, the conventional read-heater bulge in the cross-track direction. It can be seen that the maximum protrusion point of the conventional heater is located at the slider center and very close to the reader. FIG. 3C is a profile for a DFH bulge above the disclosed center-recessed DFH heater of FIG. 2B, in a down-track direction. FIG. 3D is a profile for a slider center read heater bulge above the disclosed DFH heater of FIG. 2B, in a cross-track direction. As can be seen, the presently disclosed bulge, as shown in FIG. 3D, has separated double peaks, generated by the enlarged regions (30, 40, 30) that act like two nano-bumpers and split the maximum protrusion points to cross-track positions that are about +/−6 micrometers away from the center. The position of the reader is at the center (not the protrusion peak) and the double-peaks, acting as nano-bumpers, protect the reader element from HDI/TD wear.

Figure 4A:
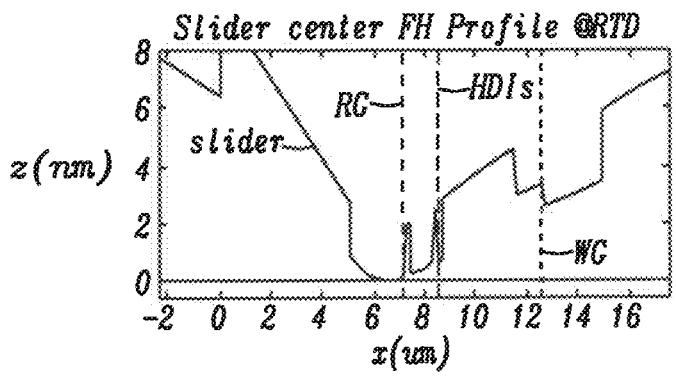
FIG. 4A is a slider bulge flying profile for the conventional read heater of FIG. 2A, in a down-track direction.
Figure 4B:
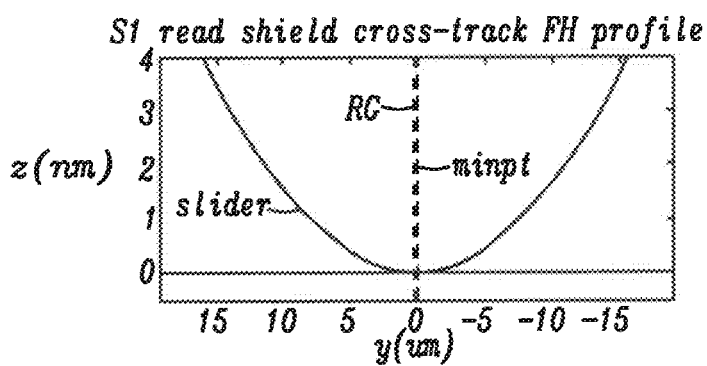
FIG. 4B is a slider bulge flying profile for the conventional read heater of FIG. 2A, in a cross-track direction.
Figure 4C:
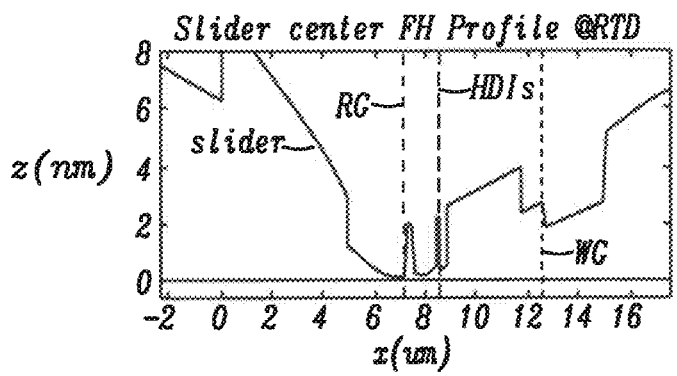
FIG. 4C is a slider bulge flying profile for the disclosed DFH heater design of FIG. 2B, in a down-track direction.
Figure 4D:
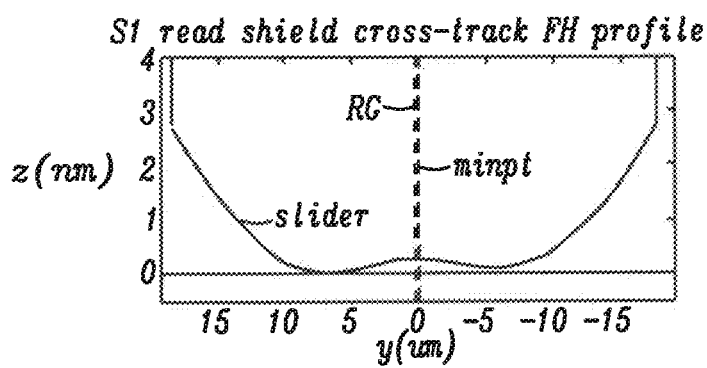
FIG. 4D is a slider bulge flying profile for the disclosed DFH heater design of FIG. 2B, in a cross-track direction.

FIGS. 4A-4D shows read TD, FH (flying height) profiles. FIG. 4A is a slider bulge flying profile for the conventional read heater of FIG. 2A, in a down-track direction. FIG. 4B is a slider bulge flying profile for the conventional read heater of FIG. 2A, in a cross-track direction. FIG. 4C is a slider bulge flying profile for the disclosed DFH heater design of FIG. 2B, in a down-track direction. FIG. 4D is a slider bulge flying profile for the disclosed DFH heater design of FIG. 2B, in a cross-track direction. Reader spacing during the TD of the conventional read heater is less than 0.1 nm (1 A) in RTD. The presently disclosed design provides for "nano-bumpers" to protect the reader in RTD. Reader spacing is 0.3 nm @RTD by the presently disclosed center-recessed read heater. The reader spacing can be adjusted from 0 nm to 1 nm by fine tuning center-recession of the read-heater design depending on the HDI/TD wear from the HDD.

Figure 5A:
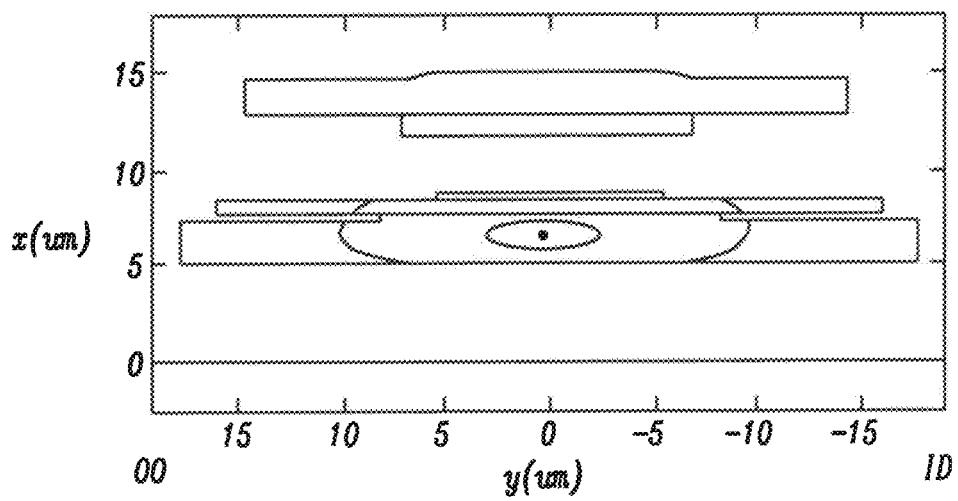
FIGS. 5A and 5B show read heater induced temperature profiles for the conventional read heater, and the disclosed read heater, respectively, during simulated operation, by shading various portions of the figure so that less shading indicates cooling temperatures.
Figure 5B:
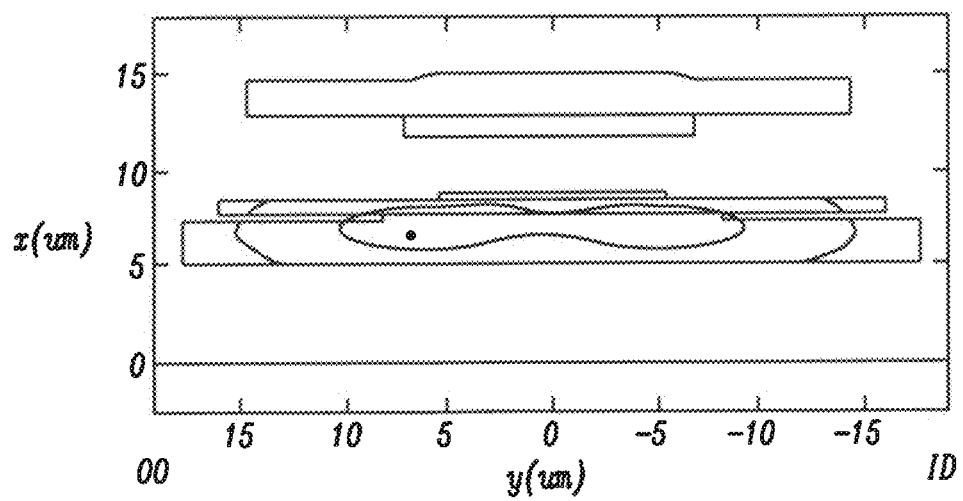

Moreover, the disclosed DFH bulge also delivers wider bulge width compared to what is delivered by the conventional bulge. It, therefore, increases TD area to trigger sufficient TD vibration in drive. FIG. 5A shows a conventional read TD area of (55 micro meters)^2. The presently disclosed bulge increases the read TD area to (88 micro meters)^2, as is shown in FIG. 5B. The bulge width and maximum protrusion position can be adjusted by fine-tuning the center-recessed type heater.

Since the disclosed DFH bulge is generated by a center-recessed type heater, the distance between the heater and the reader is increased, as compared to a conventional heater. The read heater induced temperature profile of FIG. 5A shows that the read heater maximum temperature is located at the center of the S1 read shield. The reader temperature as shown is 59 deg. C. in RTD. The read heater induced temperature profile of FIG. 5B, by contrast, shows the disclosed double-peak bulge which splits the read heater temperature peak points to the sides of the S1 read shield. Its reader temperature, as shown, is 55 deg. C. in RTD. Thus the read heater temperature rise is reduced by 12% (4 deg. C.) by the disclosed bulge. This reader temperature reduction contributes to the improvement of reader performance and reliability.

Figure 6:
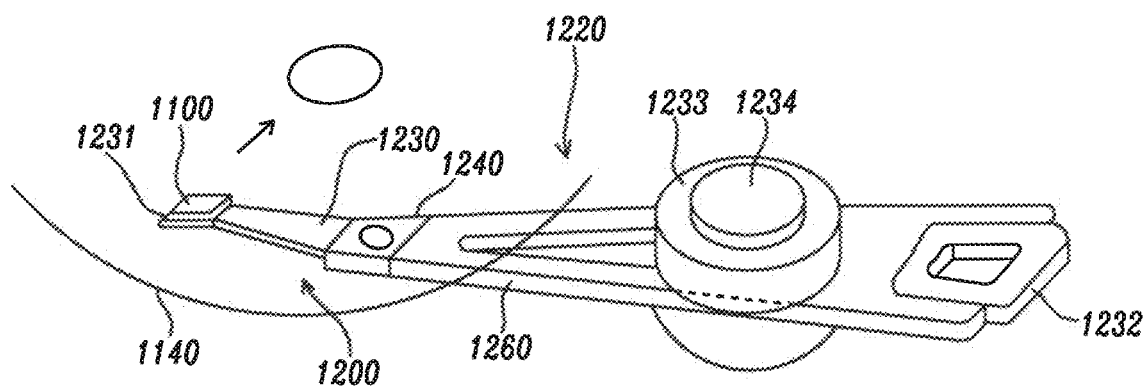
FIG. 6 shows a head gimbal assembly (HGA) on which the presently disclosed PMR is flexibly mounted.

FIG. 6 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted HAMR writer 1100 is attached to the load beam 1230 at the flexure 1231 which provides the HAMR with the proper amount of freedom of motion. A gimbal part for maintaining the PMR read/write head at a proper level is provided in a portion of the flexure 1231 to which the HAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 7:
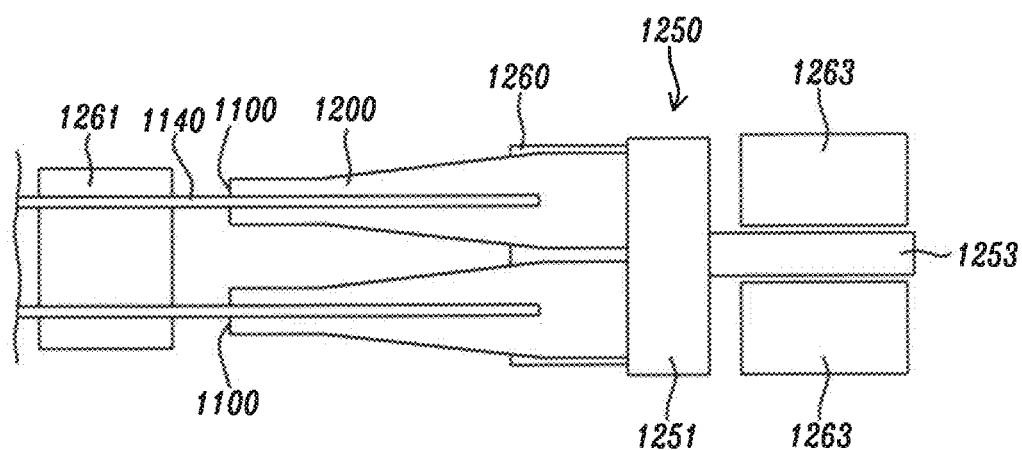
FIG. 7 shows a side view of a pair of HGA's such as those shown in FIG. 6.
Figure 8:
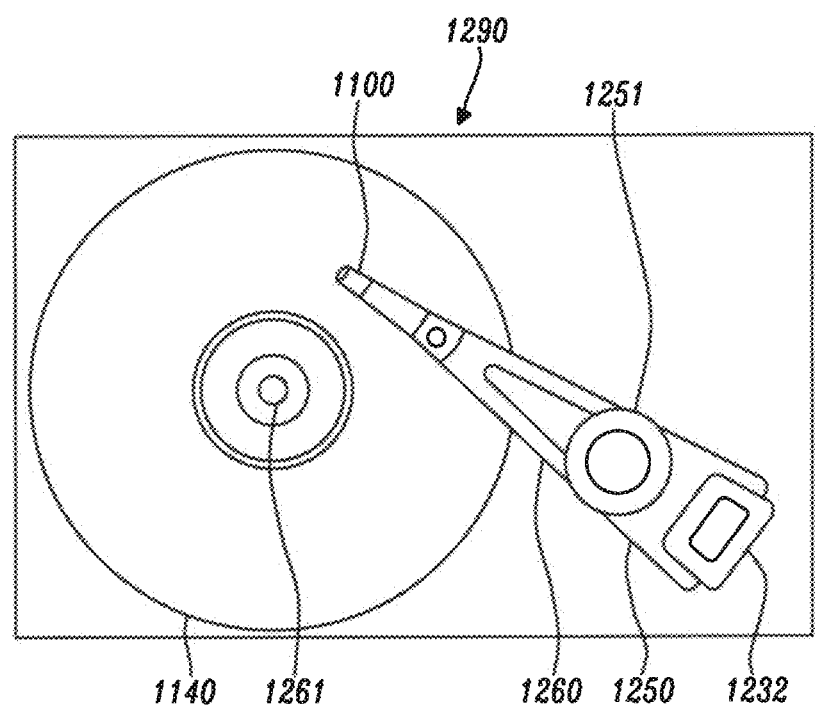
FIG. 8 shows an overhead view of the HGA's shown in FIG. 6.

Referring next to FIG. 7 and FIG. 8, there is shown a head stack assembly 1250 and a magnetic recording apparatus in which the slider-mounted HAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 7 is a side view of this assembly and FIG. 8 is a plan view of the entire magnetic recording apparatus.

Referring finally to FIG. 8, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two HAMR elements 1100 arranged opposite to each other across the magnetic recording media 14 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

Based on the modeling results shown in the figures, we see that this design offers many advantages, including:
1) Control of contact area magnitude to prevent TD "overpush" (overcompensation of heater power due to poor detection of TD) by bumper's dimension and protrusion.
2) Control of minimum point shift away from sensor, to bumper pads, for head reliability.
3) Adjustability of bumper local protrusion height and shape by choice of bumper dimension for different wafer designs, head processes and write conditions.
4) Double peaks that act as "nano-bumpers" to protect reader from HDI/TD wear by shifting the DFH TD points from center to the nano-bumpers (side of S1 read shield).
5) Reader spacing @TD is 0.3 nm in the disclosed design. It can be adjusted from 0 nm to 1 nm by the heater design being fine tuned according to the HDI/TD wear conditions in the HDD.
6) The presently disclosed DFH bulge increases the TD area from 55 micro. meters^2 to 88 micro meters^2 for sufficient TD vibration.
7) The presently disclosed DFH bulge reduces reader temperature rise by 12% (4 deg C.) compared to conventional bulge, thus improving reader performance and reliability.

As is understood by a person skilled in the art, the present description is illustrative of the present disclosure rather than limiting of the present disclosure. Revisions and modifications may be made to methods, materials, structures and dimensions employed in forming and providing a HDD slider-mounted PMR recording head configured for HAMR, the slider having an ABS topography that includes active nano-bumper pads activated by a temperature induced bulge surrounding a narrow reader/writer region that is configured to operate in conjunction with a plasmon near-field spot and wherein the bumpers provide shape alterations, resulting from thermal protrusion effects generated within said PMR, where the shape alterations provide protection to portions of said PMR head during intentional and unintentional TDs while still forming and providing such a device and its method of operation in accord with the spirit and scope of the present disclosure as defined by the appended claims.

What is claimed is:
1. A HAMR (Heat Assisted Magnetic Recording) read/write head having a thermally activated DFH (Dynamic Flying Height) bulge to protect a read head from various forms of HDI (Head Disc Interference) and reduce reader temperature and wear while in operation, comprising:

a perpendicular magnetic recording (PMR) read/write head configured for HAMR, wherein said PMR read/write head comprises a magnetically shielded GMR read head and a separate, magnetically shielded inductive write head that is activated by a write current, said read head and said write head emerging at an ABS of said PMR; wherein;

independently operating heater elements, Hr and Hw, are disposed adjacent to said read head and said write head respectively, but are proximally away from said ABS; wherein a read heater is mounted on a reader shield, said read heater having at least one recess that is centrally located whereby, when said read heater is thermally activated by passage of a current, a bulge is formed in said reader shield, said bulge being generated by a thermal expansion of said reader shield and having a physical shape including a number of double peaks corresponding to the multiplicity of recesses that are symmetrically separated and said double peaks acting as nano-bumpers to protect said read head from HDI/TD wear, thereby forming a center-recessed read heater;

wherein, as a result of said center-recessed read heater, a distance between said read heater and said read head is increased as compared to conventional read heads that do not have this shape condition;

whereupon said write head forms a narrow, protected writing region at said ABS and wherein magnetic flux is emitted by an emergent magnetic pole tip at said ABS and wherein near-field plasmon energy emerges at a trailing edge of said pole tip to enable writing on a disk medium; and wherein a pair of thermally active bumper pads, whose shapes are modified by local thermally-induced protrusions, are disposed to either side of said narrow writing region of said write head to protect said region in the event of a touchdown (TD) or other forms of head-disk interference (HDI) by shifting points of possible disk contacts towards said shields.

2. The HAMR read/write head of claim 1 wherein said thermally active bumper pads formed from said bulge extend proximally away from said ABS and are configured to absorb thermal energy generated by said heater, from said write current and from said HAMR read/write head, whereby said bumper pads thermally protrude to provide increased surface areas and enhanced protection to said write head.

3. The HAMR read/write head of claim 1 wherein both said active bumper pads are identically shaped, separated and symmetrically positioned, whereby each said active bumper pad produces a similar protrusion as said other active bumper pad when thermally activated, thereby altering the response of said slider symmetrically in a cross-track direction under conditions of a TD.

4. The HAMR read/write head of claim 1 wherein both said active bumper pads are identically shaped with triangular surfaces extending proximally rearward away from said ABS and passing over inductive magnetic coil elements whereby each said active bumper pad absorbs heat generated by said magnetic coil elements during write processes.

5. The HAMR read/write head of claim 1 wherein each said active bumper pad is shaped identically to the other, whereby each said active bumper pad produces a protrusion from said other active bumper pad when thermally activated, thereby altering the response of said slider under conditions of a TD in a symmetric manner.

6. The HAMR read/write head of claim 1 wherein, during a TD, said thermally active bumper pads shift the point of minimum approach to said disk medium of said slider ABS away from said HDIs and to said active bumper pads, to improve both TD detection and head reliability.

7. The HAMR read/write head of claim 1 whereby adjusting the size and shape of each said active bumper pad makes said active bumper pads adaptable to different head designs, write conditions and head fabrication processes.

8. A slider-mounted HAMR read/write head comprising:
said HAMR read/write head of claim 1 mounted on a slider, said slider being aerodynamically configured to maintain said HAMR read/write head at a fly height when said slider is suspended above a rotating magnetic recording disk and wherein thermal protrusions of said active bumper pads control a minimum fly height point of said slider during TD events.

9. The slider mounted HAMR read/write head of claim 8 wherein thermal protrusions caused by said active bumper pads increase the area of said slider ABS in closest approach of a disk medium during a touchdown (TD) event, whereby said HDIs are brought uniformly closer to said disk medium and said TD event is more easily detected by said HDIs.

10. The slider mounted HAMR read/write head of claim 9 wherein said active bumper pads shift the point of minimum approach to TD of said slider ABS away from sensitive regions exposed on said ABS to larger shields and, therefore, improves head reliability.

11. The slider mounted HAMR read/write head of claim 9 wherein said active heater bulge reduces reader temperature rise by 12% during HDI events, therefore improving slider reliability.

12. The slider mounted HAMR read/write head of claim 9 wherein said active heater bulge produces a heater spacing that can be varied from 0 nanometers to 1 nanometer by fine tuning the HDI/TD wear conditions.

13. The slider mounted HAMR read/write head of claim 9 wherein said active heater bulge increases said TD area from 55 microns^2 to 88 microns^2, thereby producing sufficient vibration for detection of a TD or a HDI.

14. The slider mounted HAMR read/write head of claim 8 wherein heater induced transducer temperature rise is reduced by the heater design.

15. The slider mounted HAMR read/write head of claim 8 wherein distance between peaks between heater induced transducer temperature rise is reduced by the heater design.

16. The slider mounted HAMR read/write head of claim 9 wherein a heater element having multiple recesses produces a heater bulge having the same multiplicity of nano-bumpers.

17. The slider mounted HAMR read/write head of claim 9 wherein said transducer spacing at touchdown (TD) is adjusted by bulge shape and nano-bumper height.

18. A head gimbal assembly (HGA) comprising:
(a) the HAMR read/write head of claim 1 and
(b) a suspension that elastically supports said HAMR read/write head, wherein said suspension has a flexure to which said HAMR read/write head is joined, a load beam with one end connected to said flexure and with a base plate connected to the other end of the load beam.

19. A magnetic recording apparatus comprising:
(a) the HGA of claim 18,
(b) a magnetic recording medium positioned opposite to a slider on which said magnetic read head structure is formed, (c) a spindle motor that rotates and drives the magnetic recording medium, and
(d) a device that supports the slider and that positions the slider relative to the magnetic recording medium.

* * * * *